United States Patent [19]
Bustamante et al.

[11] 3,778,217
[45] Dec. 11, 1973

[54] EXTRUSION DIE
[75] Inventors: Santiago J. Bustamante; Donald H. Schell, both of Los Alamos, N. Mex.
[73] Assignee: The United States of America as represented by the United States Atomic Energy Commission, Washington, D.C.
[22] Filed: Oct. 31, 1963
[21] Appl. No.: 320,587

[52] U.S. Cl. ............................................. 425/467
[51] Int. Cl. .......................................... B29c 17/00
[58] Field of Search ................... 207/2, 4, 10.4, 17, 207/17.4; 18/30 H, 146; 25/32, 17, 20, 17 D

[56] References Cited
UNITED STATES PATENTS
326,865  9/1855   Hammill .............................. 25/17 D
738,665  12/1929  Ober .................................. 25/17 D

*Primary Examiner*—Robert F. Stahl
*Attorney*—John H. Horan

EXEMPLARY CLAIM

1. An extruding die for extruding an article having a multiplicity of ducts through its length, comprising a plurality of spiders, a plurality of pins extending from each of said spiders, one spider having a central duct and an off-center duct so that the material to be extruded can pass through both ducts.

5 Claims, 3 Drawing Figures

INVENTOR.
Santiago J. Bustamante
BY Donald H. Schell

EXTRUSION DIE

This invention relates to an extrusion die and, more particularly, to a die wherein the extruded article has a multiplicity of holes throughout its length.

It has been known that extrusion dies are capable of extruding tubular shapes. However, increased difficulty is encountered when producing an article having a multiplicity of holes throughout its length Such a shape is useful, for instance, in fuel elements for nuclear reactors. In such application a large number of holes may be desirable in order to obtain efficient cooling of the fuel element.

The present invention is an extrusion die which permits the extrusion of articles having a large number of ducts running throughout its length. One of the principal advantages in the use of this die is the resulting even density in cross-section. The holes are formed by pins depending from dual spiders. As will be seen below, the use of dual spiders in supporting the pins enables the die to extrude an article which is of constant cross-sectional density.

It is an object of this invention to provide an improved extruding die which will extrude an article having a multiplicity of holes throughout its length.

It is a further object of this invention to provide a die from which can be extruded an article having a multiplicity of holes, said article being of nearly constant cross-sectional density.

It is anothe object of this invention to provide an extruding die for extruding an article with a multiplicity of holes, said extruding die being easily assembled or disassembled and relatively simple to manufacture.

These and other objects which will hereinafter appear are accomplished by this invention which is fully described in the specification and shown in the accompanying drawings in which.

Figure 1:
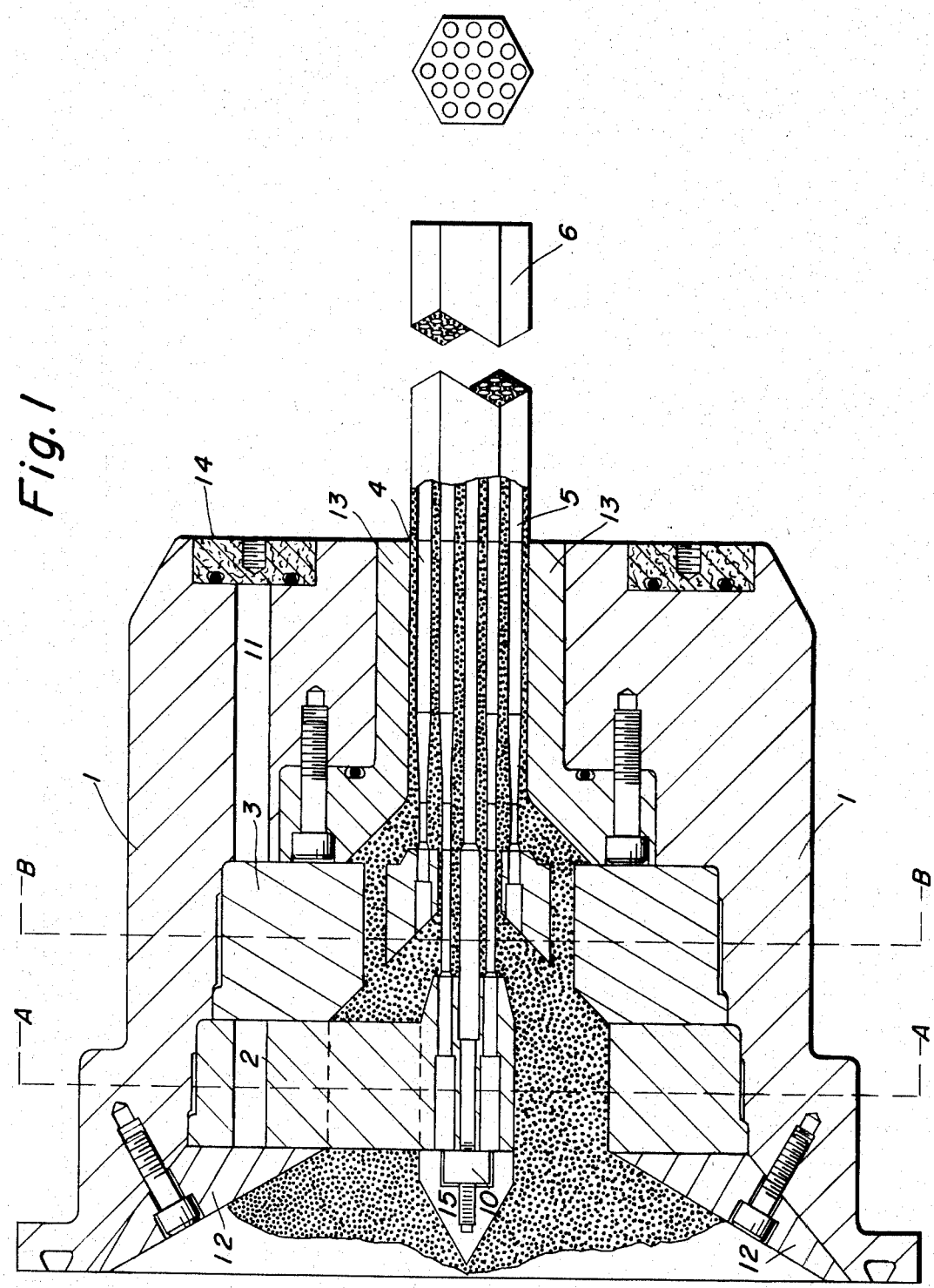
FIG. 1 is a cross-section of an extruding die embodying the invention.
Figure 2:
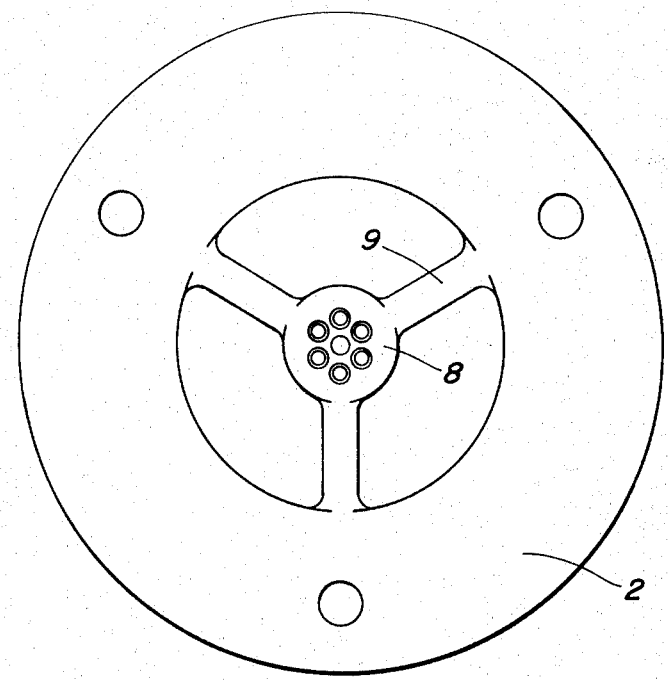
FIG. 2 is a section on the line A—A of FIG. 1.
Figure 3:
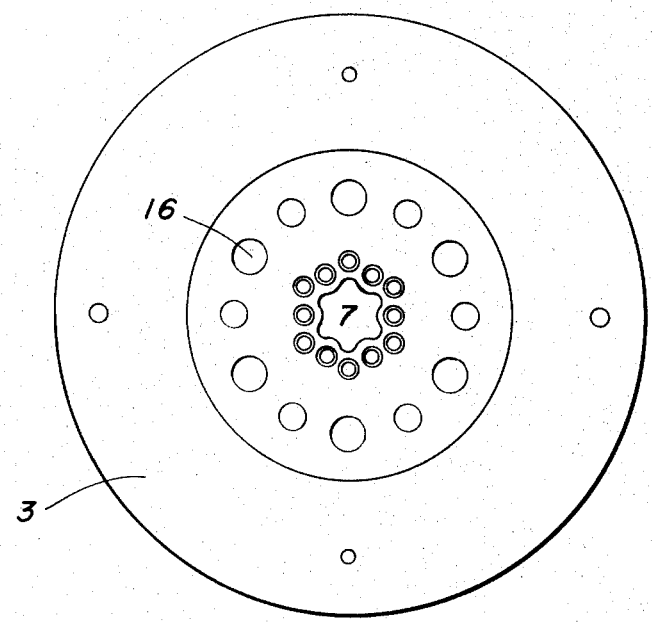
FIG. 3 is a section on the line B—B of FIG. 1.

For purposes of illustration, the embodiment shown in the drawings will produce an extruded article having 19 ducts throughout its length. The embodiment comprises a die body 1 which is cylindrical and recessed in order to contain spiders 2 and 3.

Pins 4 depend from spiders 2 and 3 and provide the mandrels in forming the multiplicity of ducts 5 in extruded article 6. It will be noted that the pins extending from spider 2 pass through a central duct 7 in spider 3. In the embodiment shown, seven pins extend from the central portions 8 of spider 2. This central portion is suspended from the main body of spider 2 by arms 9. The spaces between the main body, central portion 8 and arms 9 are provided so that the material to be extruded may pass through this spider. The seven pins of spider 2 are arranged as one central pin with six others surrounding it. The central pin is screwed into nut 10. The surrounding pins are force fit into ducts provided in the spider. The remaining 12 pins are force fit into spider 3 in the shape of a hexagon, three pins to a side.

Die body 1 contains three equi-spaced dismantling holes 11. When dismantling, a plunger rod, not shown, is inserted through the dismantling holes thereby forcing spiders 2 and 3 and their associated pins out the other side of the extrusion die. Spiders 2 and 3 are normally held in place by spacer guide 12. Plenum body 13 is tubular with the inside surface shaped so as to give the desired outside surface shape of the extruded article (in the illustrated embodiment, a hexagon). Vacuum ring 14 and its associated O-rings are provided so that a vacuum may be pulled in the extrusion chamber (not shown). Such a vacuum is often desirable in order to outgas the material to be extruded.

It can now be seen that the material to be extruded flows from the extrusion chamber (not shown) and is guided by spacer guide 12 and cone piece 15 into the ducts in spider 2 formed by the main body, arms 9 and central portion 8. The material to be extruded then follows two paths through spider 3. One of these paths is central (through duct 7) and the other is off-center (through feed holes 16). Since the material flows both centrally and off-center through spider 3, the extruded article is of nearly constant cross-sectional density.

While only a single embodiment of the invention has been shown, it is to be understood that it is capable of many modifications. For example, the number of pins may be easily modified. If 37 pins were desired, it is only necessary that 18 pins be added around the 12 pins of spider 3. In addition, it is clear that the spiders 2 and 3 may be composed of a plurality of pieces (e.g., central cylinders and outer rings for ease in dismantling). However, this latter modification is disadvantageous in that it is much more difficult to align the pins so that they are all parallel to each other. Changes, therefore, may be made which do not depart from the spirit and scope of the invention as disclosed in the appended claims.

What is claimed is:

1. An extruding die for extruding an article having a multiplicity of ducts through its length, comprising a plurality of spiders, a plurality of pins extending from each of said spiders, one spider having a central duct and an off-center duct so that the material to be extruded can pass through both ducts.

2. An extruding die as in claim 1 wherein the pins extending from a first spider means pass through the central duct in a second spider means.

3. An extruding die for extruding an article having a multiplicity of ducts throughout its length, comprising first spider means, second spider means in tandem with said first spider means, said second spider means being positioned closest to the discharge end of the die, a plurality of pins extending from each of said spiders and said second spider means having a central duct and an off-center duct.

4. An extruding die as in claim 3 wherein the pins extending from the first spider means pass through the central duct in the second spider means.

5. An extruding die as in claim 3 wherein said second spider means are recessed from the discharge end of the die.

* * * * *